July 5, 1927.
S. WELSBY
EXPANDING REAMER
Filed April 22, 1926
1,635,103
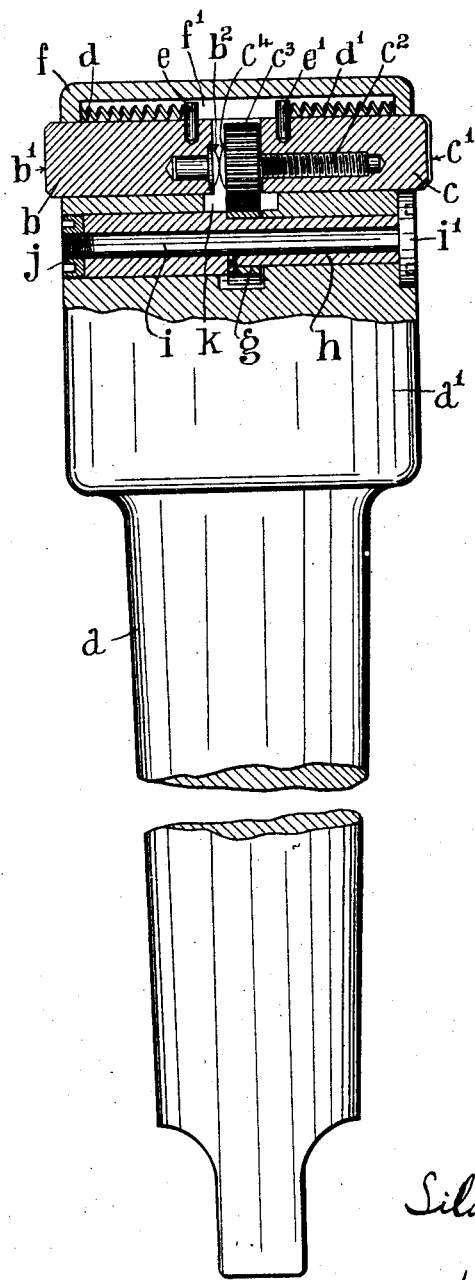
Silas Welsby,
Inventor
by Monroe E. Miller
Attorney.

Patented July 5, 1927.

1,635,103

UNITED STATES PATENT OFFICE.

SILAS WELSBY, OF HUDDERSFIELD, ENGLAND, ASSIGNOR TO DAVID BROWN & SONS (HUDDERSFIELD) LIMITED, OF HUDDERSFIELD, ENGLAND.

EXPANDING REAMER.

Application filed April 22, 1926, Serial No. 103,934, and in Great Britain June 2, 1925.

The invention relates to expanding reamers, of the type in which a pair of cutters are free to float or slide in a slot at right angles to the axis of rotation, so as to be capable of adjusting themselves to inaccuracies of alignment as between the tool and the work.

The invention has for its object to provide improved means for enabling adjustments to be made in the effective diameter of the tool.

The invention is characterized in that between the inner ends of the two cutters there is provided a spur wheel carrying a micrometer screw which works in a longitudinal threaded opening in one of the cutters, so that rotation of the spur wheel in a direction to withdraw the screw causes the cutters to be forced apart against spring action.

The invention is further characterized in that the head carrying the cutters is provided with a cylindrical transverse opening parallel to the slot in which the cutters work. A sleeve rotatable in this opening carries a pinion which meshes with the spur wheel on the screw, and has passing through it an adjusting spindle to which it can be clamped so that rotation of the spindle will cause rotation of the screw.

An expanding reamer constructed in accordance with the invention is illustrated in the accompanying drawing, and will be understood from the following description.

Referring to the drawing, the improved reamer comprises a shank $a$ having a head $a'$ in a slot in which are accommodated the diagonally opposed cutters $b$ $c$, provided at their outer ends with cutting edges $b'$, $c'$, as usual. The cutter $b$ is provided at its inner end with a spherical bearing surface $b^2$, and the cutter $c$ has a threaded opening to receive micrometer screw $c^2$ having a head in the form of a spur wheel $c^3$, the inner face of which has a spherical bearing surface $c^4$. Springs $d$, $d'$, confined between pins $e$, $e'$, projecting from the respective cutters, and the ends of a recess $f'$ in a detachable cap $f$ act to press the cutters inwardly and maintain the bearing surfaces $b^2$ and $c^4$ in contact.

The spur wheel $c^3$, on the micrometer screw $c^2$, meshes with a spur pinion $g$ fast on a sleeve $h$ rotatable in a cylindrical transverse opening in the head parallel to the slot in which the cutters work.

Passing axially through the sleeve $h$ is a spindle $i$ having an enlarged end $i'$ at one end, and screwed at the other end to receive a clamping nut $j$. When this nut is slackened the spindle $i$ can be rotated independently of the sleeve, and when it is tightened, it clamps the sleeve to the spindle so that rotation of the spindle causes rotation of the sleeve and of the pinion $g$. The head $i'$ of the spindle $i$ is appropriately divided and an indicating mark is provided on the head $a'$ to co-operate with the divisions.

If, when the cutters have been hardened and ground, they are inserted in position with the micrometer screw fully home in the cutter $c$, then by rotation of the sleeve $h$ in the appropriate direction the screw $c^2$ can be caused to work out and thus force the cutters apart until the desired effective diameter is reached.

When the reamer has been thus set, the nut $j$ can be slackened and the spindle $i$ rotated, without moving the sleeve or affecting the setting, until the zero division on the head $i$ is opposite the fixed indicating mark. If the nut $j$ be now tightened, any desired fine adjustment of the cutters can now be effected by partial rotation of the spindle $i$. In practice the micrometer screw $h$ will usually have forty threads to the inch, and the head $i'$ of the spindle will have twenty-five divisions, so that rotation of the spindle through the distance of one division will correspond to or give an increase or decrease in the effective diameter of the tool of one-thousandth part of an inch.

When in action the cutters are free to float within the limits of the depth of the recess $k$ in which the wheel $c^3$ is accommodated, the springs $d$, $d'$ acting to return the cutters to central position again when so permitted. When floating of the cutters occurs the teeth of wheel $c^3$ slide in the tooth spaces of pinion $g$, but cannot become disengaged therefrom by reason of the limitation of movement imposed by the ends of the recess $k$.

It will be apparent that the object of the invention may be attained equally well by reversing the action of the screw $c^2$. For example, the screw $c^2$ may be taken as being fixed in the cutter $c$ with the spur wheel $c^3$ threaded on the screw and bearing against the cutter $b$. Other modifications are also possible within the scope of what is hereinafter claimed, within the spirit of the invention.

It will be seen that the invention provides an expanding, floating reamer, with a micrometer adjustment, in a very simple, strong, and easily adjusted form. Removal and replacement of the cutters for sharpening can be quickly effected, and the accurate setting of the tool to the required size is a simple matter compared with the setting of many of the devices now in use.

Having thus described my invention, what I claim as new and desire to secure by Letters Patent is:—

1. An expanding reamer comprising a head, opposite cutters slidable transversely in the head, and means between the cutters for adjusting them relatively to one another, said cutters and means being capable of movement as a unit transversely of the head in either direction.

2. An expanding reamer comprising a head, opposite cutters slidable transversely in the head, spring means for moving said cutters yieldingly inwardly within the head, and means between the cutters for adjustably separating them, said cutters and last named means being capable of movement as a unit transversely of the head in either direction.

3. An expanding reamer comprising a head, opposite cutters slidable transversely in the head, and means between the cutters having a screw connection with one of them for adjusting the cutters relatively to one another, said cutters and means being capable of movement as a unit transversely of the head in either direction.

4. An expanding reamer comprising a head, opposite cutters slidable transversely in the head, a member having a screw connection with one cutter and contacting with the other cutter for adjusting the cutters relatively to one another and capable of movement transversely of the head with the cutters, and spring means for yieldingly moving said cutters inwardly relatively to the head.

5. An expanding reamer comprising a head, opposite cutters slidable transversely in the head, means between the cutters including a spur wheel having a screw connection with one cutter for adjusting the cutters relatively to one another, said cutters and means being capable of moving as a unit transversely of the head in either direction, and adjusting means mounted in the head including a pinion meshing with said spur wheel.

6. An expanding reamer comprising a head, opposite cutters slidable transversely in the head, means between the cutters including a spur wheel having a screw connection with one cutter for adjusting the cutters relatively to one another, a sleeve rotatable in the head, a pinion on the sleeve meshing with said spur wheel, and a spindle extending through said sleeve and having means for clamping it to said sleeve for rotating the sleeve with the spindle.

In testimony whereof I affix my signature.

SILAS WELSBY.